US012760780B2

(12) United States Patent
Bresso et al.

(10) Patent No.: US 12,760,780 B2
(45) Date of Patent: Oct. 13, 2026

(54) FLOATING PISTON FOR SINGLE-TUBE SHOCK ABSORBER

(71) Applicant: AKTIEBOLAGET SKF, Gothenburg (SE)

(72) Inventors: Marco Bresso, Turin (IT); Piero Demaio, Asti (IT); Andrea Petroselli, Chiusano d'Asti (IT); Massimo Forno, Asti (IT)

(73) Assignee: AKTIEBOLAGET SKF, Gothenburg (SE)

( * ) Notice: Subject to any disclaimer, the term of this patent is extended or adjusted under 35 U.S.C. 154(b) by 293 days.

(21) Appl. No.: 18/742,337

(22) Filed: Jun. 13, 2024

(65) Prior Publication Data

US 2024/0426362 A1 Dec. 26, 2024

(30) Foreign Application Priority Data

Jun. 26, 2023 (IT) ........................ 202023000002775

(51) Int. Cl.

| | |
|---|---|
| ***F16F 9/32*** | (2006.01) |
| ***F16F 9/06*** | (2006.01) |
| ***F16F 9/36*** | (2006.01) |

(52) U.S. Cl.

CPC ............ *F16F 9/3214* (2013.01); *F16F 9/067* (2013.01); *F16F 9/368* (2013.01); *F16F 9/061* (2013.01); *F16F 9/065* (2013.01); *F16F 2222/12* (2013.01); *F16F 2224/025* (2013.01); *F16F 2228/007* (2013.01); *F16F 2230/30* (2013.01); *F16F 2230/42* (2013.01)

(58) Field of Classification Search

None

See application file for complete search history.

(56) References Cited

U.S. PATENT DOCUMENTS 3,269,718 A * 8/1966 Bourcier De Carbon .................. F16F 9/088 267/64.23

11,608,138 B2 3/2023 Bresso et al.

(Continued)

FOREIGN PATENT DOCUMENTS

DE 19531794 C1 * 12/1996 ............. F16F 9/367

DE 102011083744 A1 4/2013

(Continued)

*Primary Examiner* — Devon C Kramer

(74) *Attorney, Agent, or Firm* — J-TEK LAW PLLC; Scott T. Wakeman; Mark A. Ussai

(57) ABSTRACT

A floating piston for a single-tube shock absorber is arranged slidably inside a tubular sleeve of the shock absorber so as to separate a sliding chamber and a blind chamber. The piston includes an annular support frame formed of a metallic material and having a central hole, a dynamic-lip seal which is radially external to the frame and arranged in sliding contact with the sleeve of the shock absorber so as to define a radial seal external to the frame, and a central flexible membrane arranged to hermetically close the central hole and deformable so as to anticipate the complete movement of the floating piston. The dynamic-lip seal and the flexible membrane are made of two elastomeric materials which are different from each other, the elastomeric material of the membrane being more flexible and elastic than the elastomeric material of the dynamic-lip seal.

8 Claims, 3 Drawing Sheets

(56) References Cited

U.S. PATENT DOCUMENTS

| | | | | |
|---|---|---|---|---|
| 11,668,364 | B2 * | 6/2023 | Yoshida, II | B60G 13/08<br>188/269 |
| 2006/0180418 | A1 * | 8/2006 | Kojima | F16F 9/067<br>188/314 |

FOREIGN PATENT DOCUMENTS

| | | | | | |
|---|---|---|---|---|---|
| DE | 102017004478 | A1 | * | 11/2018 | F16F 9/061 |
| EP | 3112720 | A1 | * | 1/2017 | F16F 9/067 |
| FR | 3130913 | A1 | * | 6/2023 | F16F 9/08 |
| JP | S58184044 | U | * | 12/1983 | |
| JP | S63148509 | U | * | 9/1988 | |
| JP | 2009121617 | A | * | 6/2009 | F16F 9/067 |
| WO | WO-9800653 | A2 | * | 1/1998 | F16F 9/067 |

* cited by examiner

FLOATING PISTON FOR SINGLE-TUBE SHOCK ABSORBER

CROSS-REFERENCE

This application claims priority to Italian patent application no. 202023000002775 filed on Jun. 26, 2023, the entire contents of which are fully incorporated herein by reference.

BACKGROUND OF THE INVENTION

The present invention relates to shock absorbers, and more particularly to floating pistons for a single-tube gas shock absorber, preferably for use in vehicle suspension.

Single-tube gas shock absorbers are known and typically include a sleeve, a floating piston arranged inside the sleeve and defining two chambers, a sliding chamber and a blind or enclosed chamber, and a rod slidable inside the sleeve and provided with an end head slidable along or within the sliding chamber.

In single-tube gas shock absorbers of the type described above, the sliding chamber is normally filled with oil, while the blind chamber is normally filled with gas, and the floating piston is arranged inside the sleeve so as to separate the oil from the gas.

A known floating piston typically includes a supporting and stiffening core made of metallic material and provided with a central hole, a seal radially external to the metal core and arranged in sliding contact with the sleeve of the single-tube shock absorber and a central flexible sleeve arranged so as to hermetically close the central hole. The flexible sleeve is capable of being deformed so as to anticipate the complete movement of the piston and therefore provide the single-tube shock absorber with a greater reactivity and response during absorption of the minor roughness of the road surface, without transmitting it to the vehicle and the driver/rider.

The flexible membrane of the floating piston must be able to flex either toward the sliding chamber or, alternatively, toward the blind chamber depending on the variations in pressure between the chambers of the shock absorber, and must be likewise sufficiently flexible so as to be able to be deformed before the start of displacement of the floating piston. The fact that the membrane starts to flex in anticipation of the movement of the piston is equivalent, therefore, to a reduction in the static friction of the floating piston.

In the floating pistons of the type described above, both the radially outer seal and the flexible membrane are made of elastomeric material and the rigidity of the radially outer seal required to ensure a given static friction against the sleeve, primarily to ensure an axial sliding action which is always controlled, cannot be easily combined with the flexibility required of the flexible membrane to be capable of rapid deformation. Likewise, also the flexibility required to allow deformation of the flexible membrane, in particular rapid deformation, cannot be easily combined with the rigidity required of the radially outer seal for ensuring a given static friction against the sleeve.

Therefore, in the known type of floating pistons described above, it is always required to find a compromise between the sealing functions and the flexibility functions to the detriment of either one, i.e. to the overall performance of the floating piston itself.

SUMMARY OF THE INVENTION

In order to substantially solve the aforementioned technical problems, one object of the present invention is to provide a floating piston for a single-tube gas shock absorber which is able to optimize both performance in terms of sealing action and performance in terms of flexibility.

Therefore, according to the present invention, a floating piston for a single-tube shock absorber, the shock absorber having a tubular sleeve, the floating piston being slidably arranged within the tubular sleeve so as to separate a sliding chamber from a blind chamber, comprises an annular support frame formed of a metallic material, having an L-shaped cross-section and provided with a central hole. A dynamic-lip seal is disposed radially external to the frame and arranged in sliding contact with the sleeve of the shock absorber so as to define a radial seal external to the frame. A central flexible membrane is arranged so as to hermetically close the central hole of the support frame and is capable of being deformed so as to anticipate the movement of the floating piston. The dynamic-lip seal and the flexible membrane are formed of two different elastomeric materials, the elastomeric material of the membrane being more flexible and elastic than the elastomeric material of the dynamic-lip seal.

Further preferred and/or particularly advantageous embodiments of the invention are described in accordance with the characteristic features indicated in the attached dependent claims.

BRIEF DESCRIPTION OF THE SEVERAL VIEWS OF THE DRAWINGS

The present invention will now be described with reference to the attached drawings which illustrate a non-limiting example of embodiment thereof, in which.

DETAILED DESCRIPTION OF THE INVENTION

Figure 1:
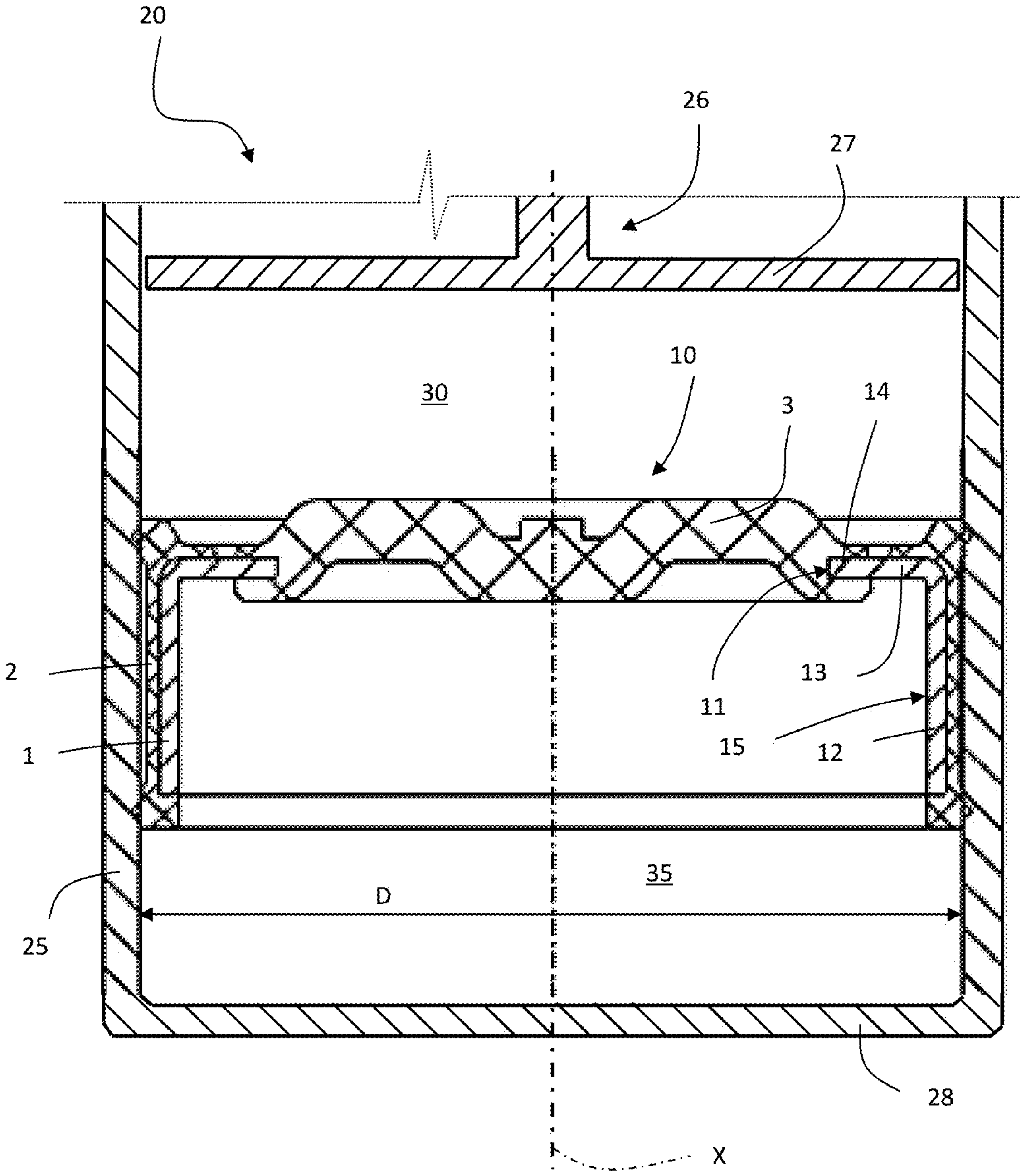
FIG. 1 is a cross-section of a floating piston for a single-tube gas shock absorber, according to a preferred embodiment of the present invention.
Figure 2:
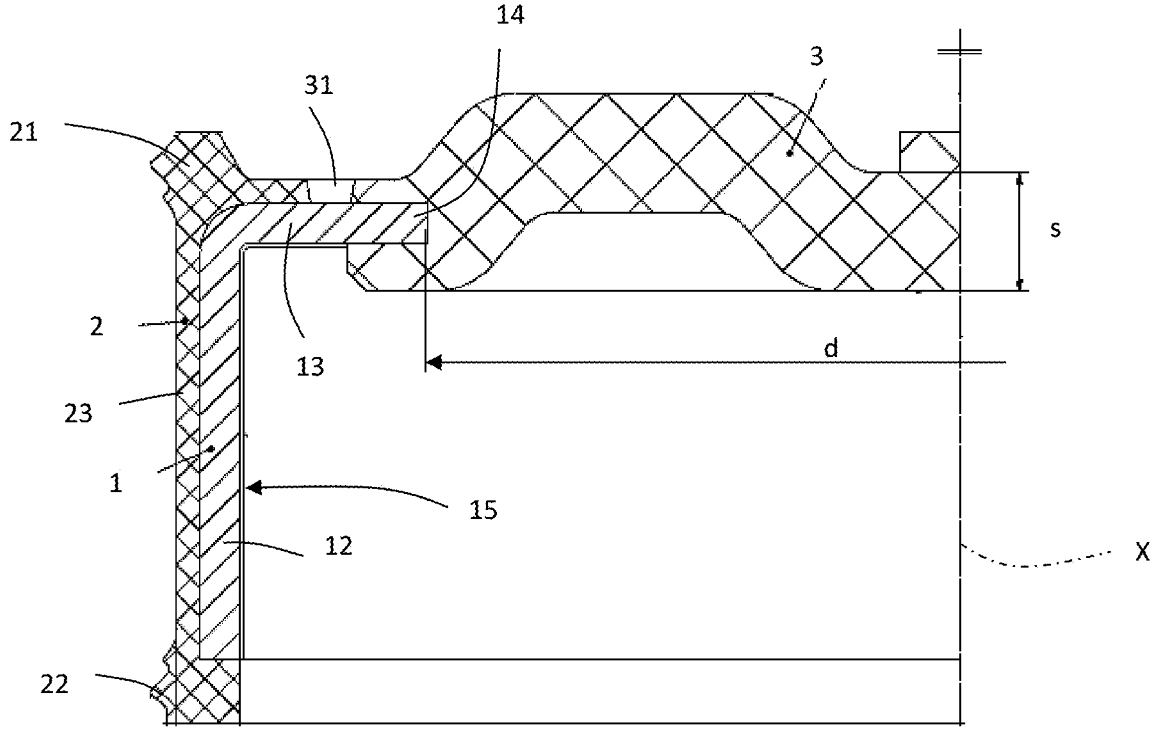
FIG. 2 is an enlarged, detailed on a larger scale, of the floating piston according to FIG. 1.

According to the present invention and with reference to FIGS. 1 and 2, a floating piston 10 for a single-tube gas shock absorber 20 is provided, the shock absorber 20 having a main, central axis X and comprising a sleeve 25 and a rod, schematically shown and indicated by 26, which is slidable inside the sleeve 25 and is provided with an end head 27, which is also slidable along the sleeve 25.

According to the preferred embodiment of the present invention, the floating piston 10 is arranged inside the cylindrical sleeve 25 so as to separate from each other a sliding chamber 30 filled with oil and engaged by the rod 26, and a blind or enclosed chamber 35 filled with gas and axially limited at one end by the floating piston 10 and at an opposing end by a bottom wall 28 of the sleeve 25.

The floating piston 10 moveable or displaceable axially inside the sleeve 25 and comprises a support and stiffening frame 1, a dynamic lip seal 2 and a central flexible membrane 3. The support and stiffening frame 1 is made of metallic material, is L-shaped in an axial cross-section passing through the axis X and is provided with a central hole 11. The dynamic-lip seal 2 is disposed radially external to the support frame 1 and is arranged in sliding contact with the sleeve 25 of the shock absorber 20. The central flexible membrane 3 is arranged so as to hermetically close the central hole 11 and is able to be deformed so as to anticipate the complete movement of the floating piston 10 and to thereby provide the single-tube shock absorber 20 with a greater reactivity and response during absorption of minor roughness.

More specifically, the support frame 1 includes a cylindrical wall 12 that is coaxial with the central axis X and an annular wall 13 which extends radially and transverse to the axis X and is provided with a radially inner free edge 14 defining the central hole 11. The support frame 1 is substantially in the form of a cup-shaped body, the bottom wall of which is defined by the annular wall 13 and, in the preferred example of embodiment shown in FIGS. 1 and 2, is mounted inside the sleeve 25 so that a concavity 15 thereof is directed toward the bottom wall 28 of the sleeve 25.

The seal 2 is provided with two annular end lips 21 and 22, i.e. a first lip 21 on the oil side and a second lip 22 on the gas side, which are connected together by a cylindrical wall 23 lining the cylindrical wall 12 of the frame 1. The seal 2 is made of a first elastomeric material which is resistant to high temperatures and is co-molded together with the support frame 1 so as to define a radial seal external to the frame 1.

The membrane 3 is formed about the edge 14 of the central hole 11, is made of a second elastomeric material that is different from the first elastomeric material of the radial seal 2, the second material having particular characteristics as specified below and is designed to optimize flexibility and strength.

The floating cylinder 10 is a separator of two fluids, namely an oil and a gas. The flexible membrane 3 is capable of flexing so as to thereby change the volume of each of the two chambers, i.e. the sliding chamber 30 and the blind chamber 35. A main purpose of the optimized membrane 3 is to ensure a high degree of flexibility of the membrane 3 so as to be capable of flexing following small variations in pressure between the two chambers 30, 35.

The floating piston 10 may be mounted inside the sleeve 25 both with its concavity 15 directed toward the bottom wall 28 and with its concavity 15 directed toward the rod 26.

To better understand the importance of the increased flexibility of the membrane 3, it is again noted that a motorcycle wheel receives impulses from contact with the ground and transmits these impulses to the shock absorber. The main purpose of any shock absorber is to absorb such impulses without transmitting them to the vehicle and the driver/rider. In order to absorb impulses, a shock absorber must be able to compensate for the variations in compression/extension occurring with variations in pressure inside the absorber. A very flexible membrane 3 therefore ensures a rapid and effective response of the shock absorber 20.

For this purpose, the second elastomeric material of the flexible membrane 3 has been defined by means of physical and design characteristics which were not foreseeable previously and therefore the result not of mere design activity, but of an inventive activity that is not directly deducible from the technical knowledge of the sector. The parameters on which the inventive activity is based relate to the choice of the physical characteristics of the second elastomeric material and the design of the membrane 3, in particular the thickness and form or shape of the membrane 3.

As regards the elastomeric material of the membrane 3, the material must have a series or group of physical characteristics which ensure increased flexibility.

In the case of elastomeric materials, the flexibility of such materials may be defined, for example, as being inversely proportional to the Shore A hardness. The preselected elastomeric material of the membrane 3 is preferably a butadiene and acrylonitrile copolymer and has a hardness of between 55 Shore A and 70 Shore A. As such, the second elastomeric material of the membrane 3 has substantially different properties from the first elastomeric material used to fabricate the seal 2, the first elastomeric material having substantially greater hardness with values ranging between 70 Shore A and 85 Shore A.

Another important factor is the choice of the modulus of elasticity, which for the elastomeric material of the membrane 3 must have values within 0.5 MPa and 4 MPa, while the modulus of elasticity of the elastomeric material of the seal 2 is not less than 1 MPa.

Also, as regards the choice of the "elongation at break" value (i.e., fracture strain), the two elastomeric materials also differ from each other in this factor as well. Specifically, the elongation at break of the second elastomeric material of the membrane 3 must be between 200% and 400%, while the elongation at break of the first elastomeric material of the seal 2 is not greater than 170%.

Operating in synergy with each other, all the abovementioned physical characteristics (hardness, modulus of elasticity and elongation at break) of the second material leads to an increase in the flexibility of the membrane 3, specifically to keep the extensional rigidity of the membrane 3 within a predefined limit and equal to 49 N/mm. In other words, forty-nine Newtons (49 N) is the maximum admissible force for obtaining the axial displacement of 1 mm of the membrane 3.

With reference to FIG. 2, regarding the design of the membrane 3, due to the high elongation at break values of the preferred material, the thickness s of the flexible membrane 3 may be conveniently reduced to values of between two millimeters (2 mm) and three and one tenth millimeters (3.1 mm). Therefore, because of this design parameter, it is possible to further increase the exchange of volume between the two fluids.

Preferably, in order to further the aim of maximizing the exchange of volume between the two fluids, the area of the membrane 3 should be maximized. However, the pressing of the metallic frame 1 must ensure a strong support for the membrane 3. For this reason, the inner diameter d (FIG. 2) of the frame 1 may be correlated to the inner diameter D (FIG. 1) of the sleeve 25 according to the relation:

$$D-15\text{ mm}<d<D-5\text{ mm}$$

All the above-described selected design parameters interact with the technical characteristics of the material and help define the predetermined extensional rigidity value which the membrane 3 must not exceed.

Figure 3:
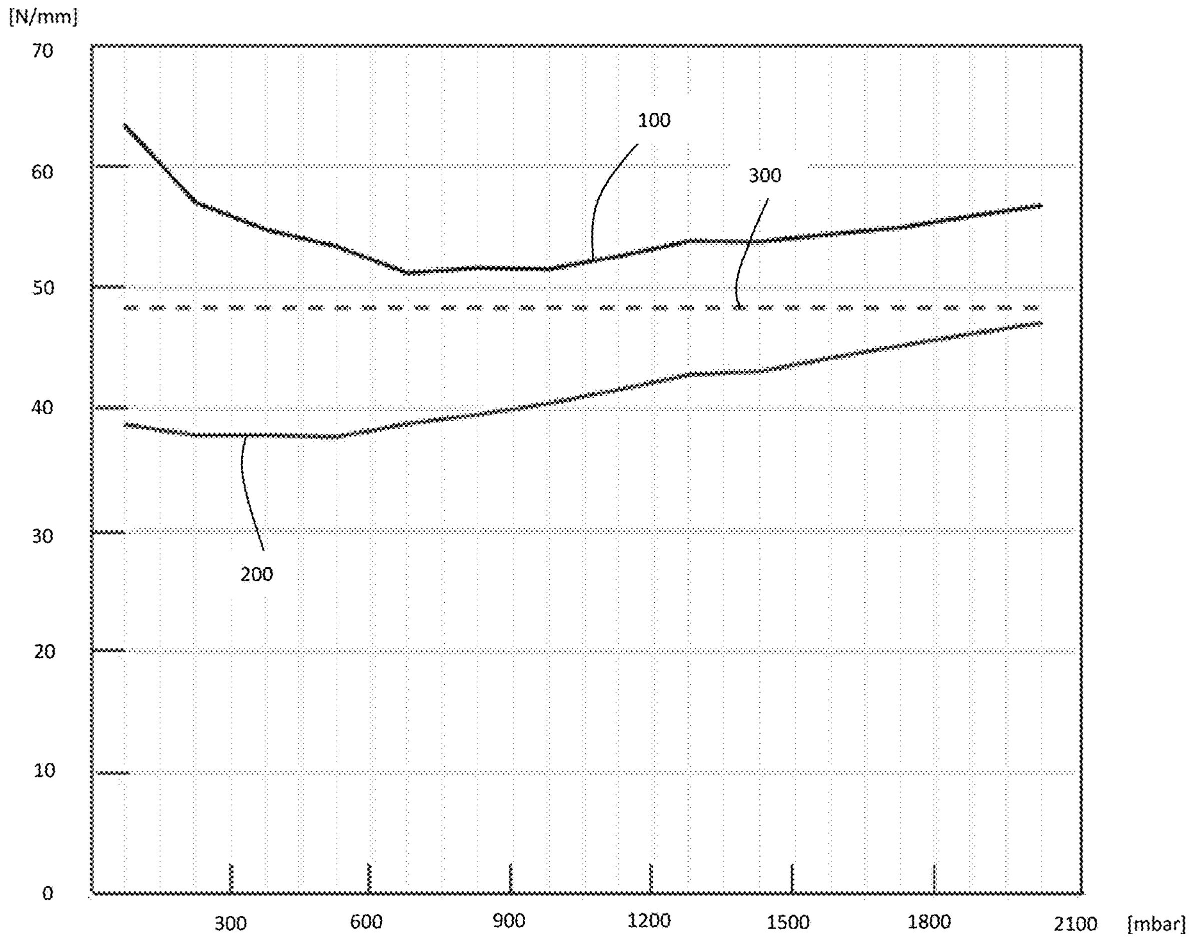
FIG. 3 is a graph which compares the performance of the floating piston of FIG. 1 with a floating piston realized in accordance with the prior art.

FIG. 3 is a graph showing the results of tests that were conducted, which show the extensional rigidity of a membrane of a floating piston plotted against the working pressure during operation. In this graph, the x-axis shows the pressure values in millibars (mbar) and the y-axis shows the rigidity values expressed as force/displacement in newtons per millimeter (N/mm). Moreover, the graph shows a first curve 100 relating to a membrane using an elastomeric material of the known type (for example that of the dynamic seal of the floating piston), a second curve 200 relating to a membrane using the elastomeric material according to the invention and having the physical characteristics indicated above, and a straight broken line 300 which represents the limit value of the extensional rigidity equal to 49 N/mm.

It may be seen that the curve 200, relating to the membrane 3 according to the present invention, remains constantly well below the predetermined limit value for the rigidity upon variation of the operating pressure.

From this graph, it may also be understood that the second elastomeric material defined for the membrane 3 could not be the same material which is to be used for the dynamic seal 2, since the dynamic lips 21, 22 would be incapable of withstanding the working pressures if formed of the second material. Therefore, the optimized elastomeric material may be used for the membrane 3, while an elastomeric material of the known type may be utilized to form the dynamic lips 21, 22 and, more generally, to fabricate the seal 2.

Preferably, the different elastomeric materials of the radially outer seal 2 and of the flexible membrane 3 are simultaneously injected inside the mold used for production of the floating piston 10 and merge together above the annular portion 13 of the frame 1, but are practically separated from each other by a constriction zone 31 for separating the flows of the two materials during the simultaneous injection. The two materials will therefore merge together to a limited extent in this zone.

Furthermore, in the floating piston 10 according to the present invention, the different elastomeric materials of the radially outer seal 2 and of the flexible membrane 3 must satisfy a number of conditions, as follows:

a) the two materials must be chemically stable in relation to each other; since, in the constriction zone 31, a merging together—albeit limited—of the two materials occurs, these elastomeric materials must be stable (namely not reactive) vis-à-vis each other so as to retain their own chemical composition and associated physical characteristics;

b) the materials must have similar viscosity values so as to allow the mold injection operation to be performed in similar times; and c) the two materials have similar vulcanization times, so that they may be molded together.

If conditions a) and b) above are not met, the result would be a major contamination of the dynamic lips by the elastomeric material of the membrane 3, or vice versa. Such contamination would negatively affect the functionality of the floating piston as well as its aesthetic appearance.

If condition c) is not met, separation of elastomeric material from the constriction zone could occur with the resultant defects.

Basically, the choice of a specific elastomeric material as described above for the membrane 3 of the floating piston 10 offers the following advantages:

by keeping the extensional rigidity of the membrane below 49 N/mm, the membrane 3 acquires a high degree of flexibility and therefore improves the sensitivity of the shock absorber 20. This means that the membrane 3 also reacts to the small variations in pressure, improving the performance of the shock absorber 20 in terms of comfort for the drivers/riders (an improved damping effect) and static friction of the shock absorber (absorption of the variations in pressure). In fact, the technical function of the floating piston 10 is to maintain the pressure equilibrium inside the two shock absorber chambers 30, 35: when an external load in one of the two chambers 30 or 35 causes an increase in the pressure within one of the chambers 30, 35, the piston 10 moves or axially displaces until the pressures inside the two chambers 30, 35 are balanced. If the same elastomeric material as that of the radially outer seal 2 were to be used for the flexible membrane 3, the flexible membrane 3 could guarantee only a limited axial displacement and therefore only a limited volume of displaced fluid (gas/oil). The use of a specific elastomeric material for the flexible membrane 3 instead allows a greater volume of fluid to be displaced; and the radially outer sealing lips 21, 22, being made of a material different from that of the membrane 3, maintain a good performance in terms of dynamic seal and resistance to high pressure peaks.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A floating piston for a single-tube shock absorber, the shock absorber having a tubular sleeve, the floating piston being slidably arranged within the tubular sleeve so as to separate a sliding chamber from a blind chamber, the floating piston comprising:

an annular support frame formed of a metallic material, having an L-shaped cross-section and provided with a central hole;

a dynamic-lip seal disposed radially external to the frame and arranged in sliding contact with the sleeve of the shock absorber so as to define a radial seal external to the frame; and a central flexible membrane arranged so as to hermetically close the central hole of the support frame and capable of being deformed so as to anticipate movement of the floating piston;

wherein the dynamic-lip seal and the flexible membrane are formed of two different elastomeric materials, the elastomeric material of the membrane being more flexible and elastic than the elastomeric material of the dynamic-lip seal.

2. The floating piston according to claim 1, wherein the elastomeric material of the membrane has a hardness of between 55 Shore A and 70 Shore A, a modulus of elasticity of between 0.5 MPa and 4 MPa and an elongation at break of between 200% and 400%.

3. The floating piston according to claim 1, wherein a thickness of the flexible membrane is between 2 mm and 3.1 mm.

4. The floating piston according to claim 1, wherein an inner diameter of a radially inner edge of the frame is correlated to an inner diameter of the sleeve according to the relation:

$$D-15\text{ mm}<d<D-5\text{ mm};$$

in which “D” is the inner diameter of the edge of the frame and “d” is the inner diameter of the sleeve.

5. The floating piston according to claim 4, wherein the frame includes a cylindrical wall and an annular wall extending radially inwardly from the cylindrical wall, the annular wall providing the radially inner edge of the frame and defining the central hole.

6. The floating piston according to claim 5, wherein the dynamic-lip seal includes two annular end lips connected to each other by a cylindrical wall, the cylindrical wall of the seal lining the cylindrical wall of the frame.

7. The floating piston according to claim 1, wherein the flexible membrane has an extensional rigidity of less than 49 N/mm.

8. The floating piston according to claim 1, wherein the first elastomeric material of the seal and the second elastomeric material of the membrane are chemically stable with respect to each other.

* * * * *